Patented June 10, 1947

2,422,078

UNITED STATES PATENT OFFICE 2,422,078

TREATMENT OF CELLULOSIC FIBRES

Howard M. Buckwalter, Detroit, Mich., assignor to United States Rubber Company, New York, N. Y., a corporation of New Jersey No Drawing. Application July 4, 1944, Serial No. 543,487

3 Claims. (Cl. 117—168)

This invention relates to the treatment of cellulosic fibres, and more particularly grey cotton cords whereby to improve the tensile strength and other properties.

In my U. S. Patent No. 2,297,536 and in British Patent No. 545,716, there is described how grey cotton fibres, cords, etc., can have their tensile strength improved by treatment with water-soluble salts of abietic acid or rosinates.

I have now found that certain resins, other than rosin, which resins contain no abietic acid and which are herein referred to as copal resins, and particularly the congo copals, contain acids which when saponified with alkali, form aqueous solutions, and also improve the strength of the grey cotton after it has been briefly treated with said solutions, in a manner described in said patents.

Native congo copal resins contain from about 40 to 60% of a group of high molecular weight carboxylic acids, collectively described as native congocopalic acids which includes congocopalolic acid (Mantell's "The Technology of Natural Resins," chapter 4, published by John Wiley & Son; 1942). As known in the art, the resins are marketed as crude unprocessed, or as thermally processed ("run" copal). The composition of the "run" copal is unknown and its acids are therefore referred to herein as "run" native congocopalic acids. The "run" congocopalic resin solutions are preferred, since they provide somewhat better improvements in tensile, compared with tensiles derived from the crude copals.

In using the crude, or "run" copal, resins, solutions for treating the cotton cord, may be derived from saponifying the resins directly with alkali, or freeing the resin acids by treating the same with an acid such as sulfuric or acetic, and then forming the water-soluble alkali salt by subsequent treatment with alkali.

The tensile improvements run as high as 20%, tested at 70° F., 60% relative humidity, compared with the chemically untreated cotton cord.

The examples below, in detail, are given to illustrate the invention, using 8 different solutions. Since all of the solutions have a relatively high surface tension, it is necessary to carry out the cotton cord treatment at 95° C. to insure thorough wetting out. The same type of apparatus as shown in British Patent No. 545,716 or in my U. S. Patent No. 2,297,536, may be used in applying the chemical of this invention. Two series of treatments are made involving, respectively, what is called the unwashed and washed treatment, detailed as follows: The cord that was used in this experiment is characterized as follows:

| | |
|---|---:|
| Kind of cotton | Carded American |
| Cord construction | 11.65/4/2 |
| Tensile strength_____pounds__ | 17.5 |
| Per cent elongation at 10 lbs_____ | 7.75 |
| Yards per lb | 1090 |
| Gauge _____inches__ | .0325 |

1. (Unwashed) treatment of the cord with the solution for 2 seconds at 95° C.; excess solution is removed with vacuum; material is dried 15 minutes at 110° C.

2. (Washed) treatment for 2 seconds at 95° C.; cords washed with cold running water for 10 seconds; excess solution removed with vacuum; material dried 15 minutes at 110° C.

PREPARATION OF SOLUTIONS

*Solution 1 (sodium "run" congocopalate)*

500 grams powdered "run" congo copal (acid No. 70.3) are mixed with 1 liter of glacial acetic acid and heated 1 hour on a steam bath under reflux; extract is decanted through filter; extraction is repeated four times using 500 ml. acetic acid each time. Extracts are combined and the residue discarded. Combined extracts are concentrated to half volume and poured into 6 liters cold water. The precipitated "run" congocopalic acids are filtered, washed, and dried. Yield: 225 grams (acid No. 108); M. P. 72–78° C. 132 grams of the dry acids are dissolved in 950 grams hot water containing 10.2 grams NaOH. Total solids: 13.2%.

*Solution 2*

Solution 1 is diluted with water to give 8.87% total solids.

*Solution 3 (sodium "run" congocopolate)*

500 grams of powdered "run" congo copal (acid No. 70.3) are mixed with 1500 grams water containing 26 grams NaOH and digested on a steam bath overnight under reflux. The resulting mixture contains all of the acidic material in solution as their respective sodium salts in which the non-acidic insoluble material is suspended or dispersed. The insoluble material is allowed to settle overnight and decanted off the supernatant liquid through a filter. The residue is discarded. The filtrate is concentrated to 18.5% total solids.

Solution 4

Solution 3 is diluted with water to give 8.7% total solids.

Solution 5 (sodium congocopalate)

500 grams pulverized congo copal (acid No. 100) are mixed with 2500 grams water containing 36 grams NaOH and the mixture heated overnight on a steam bath. The solution of sodium copalates so obtained is decanted from the insoluble "rubbery" constituents and the latter washed three times with fresh 1000 gram portions of boiling water. The residue is discarded. The three washings are combined with the original solution and the whole concentrated to 14.1% total solids. A scum which appeared during concentration is skimmed off. The solution is quite turbid indicating that the separation of acidic from non-acidic material is not sharp. The solution is diluted with water to give about 10% total solids.

Solution 6 (sodium congocopalate)

After cord treatments, solution 5 is diluted to a total volume of 6 liters and acidified to pH 5.4 with 5% sulfuric acid. The precipitated congocopalic acids are filtered off, washed and dried. 122 grams of the dried acids (acid No. 102; M. P. 165° C.) are dissolved in 970 grams hot water containing 8.9 grams NaOH. Total solids 12.2%. This solution like solution 5 is also turbid indicating precipitation, and re-solution does not effect further purification of the original extract.

Solution 7 (sodium congocopalate)

500 grams congo copal are extracted ten times with 300 gram portions of boiling glacial acetic acid. Extracts are combined and concentrated to 1.5 liters and poured into 6 liters of cold water. The precipitated congocopalic acids are filtered, washed and dried. Yield: 242 grams (acid No. 120.5); M. P. 85–90° C. 134 grams of the acids are dissolved in 960 grams water containing 11.7 grams NaOH. Total solids: 13.4%. The solution is clear, indicating sharp separation of acidic from non-acidic materials with acetic acid.

Solution 8

Solution 7 is diluted with water to give 9.9% total solids.

Tensile Data

| Solution No. | Per cent Total Solids | Per cent Tensile Improvement | | Copal | Removal Medium for Resin Acids |
|---|---|---|---|---|---|
| | | Not Washed | Washed | | |
| 1 | 13.2 | 18.8 | 18.2 | "Run" | Acetic Acid. |
| 2 | 8.9 | 17.5 | 16.1 | ---do--- | Do. |
| 3 | 18.6 | 20.2 | 19.1 | ---do--- | NaOH. |
| 4 | 8.6 | 17.6 | 17.0 | ---do--- | Do. |
| 5 | 10.0 | 11.4 | 7.8 | Crude | Do. |
| 6 | 12.2 | 14.3 | 9.7 | ---do--- | Do. |
| 7 | 13.4 | 15.1 | 13.4 | ---do--- | Acetic Acid. |
| 8 | 9.9 | 17.0 | 16.9 | ---do--- | Do. |

The chemically treated cotton cord or yarn may be used either in the unstretched condition after treatment with the chemical salt solution, or it may be stretched while wet from the treating solution, or if the chemically treated cotton has been meanwhile dried, it can be rewetted and then stretched with any desired degree of tension. Preferably, the tension imparted to the cords should be just short of their breaking point. After the cord is stretched to the proper extent, it is dried while its stretched length is maintained, that is, without permitting shrinkage, and as referred to in my British patent above mentioned, involving drying while maintaining the cord under a uniform state of length.

By washing the cord or yarn, excess chemical solution is removed, and this expedient may be used together with the use of vacuum to remove excess solution. The washing may be before, during, or after the stretching operation, but preferably follows the stretching operation, because in the stretching operation the chemical solution is expressed to the outer surface of the cord where it is more easily removed by washing. The water for washing may be cold or hot.

While I have shown and described a method of treating finished tire cord, it is to be understood that the grey cotton fibres, yarn, plied yarn or cord, may be treated at any of the various stages of the processing of the cotton, including treatment of the cotton prior to the formation of the cord or any component part thereof.

The grey cotton fibres, yarns, or cord may be dipped in a water solution of the chemicals, or mixtures of the chemicals, or the solution may be made to contact the cotton as by a spraying operation, or otherwise. If desired, the cotton after treatment with the chemical may be dried for storage or shipment.

The invention may be applied to the treatment of grey cotton in various forms, e. g. unspun cotton, yarns, plied yarns, cords, cabled yarns, twisted products of plied yarns, etc.

While the treated cotton may be rubberized, as shown in my previous patents, it may otherwise be processed to produce unrubberized fabrics containing the treated cotton, all being within the broad scope of the invention.

The term "cotton waxes" herein means that group of non-cellulosic water-insoluble components of grey cotton which are characterized by extreme solubility in hot ethyl alcohol. Also, the term "cord" is used hereinafter broadly to mean cord, yarn, plied yarn, strand, thread, string, or the like. Cords as processed according to my invention may be employed as such, or combined with other processing, for the fabrication of various articles, for example, hose, tires, belting, and other strain-resisting elements, and for the preparation of various fabrics, woven, knitted, or braided.

While the foregoing is chiefly concerned with the improved tensile of grey cotton fibers, it may be extended to natural cellulosic fibres in general, which have substantialy their native composition, for example, flax, hemp, jute, etc.

Having thus described my invention, what I claim and desire to protect by Letters Patent is:

1. A method of improving the tensile strength of naturally-occurring cellulosic fibres which comprises briefly treating the yarns or cords thereof having substantially their natural composition and structure, with an aqueous solution comprising an alkali-metal salt of acids of "run" native congo copal resin.

2. Grey cotton modified to have a tensile strength improvement by a short treatment with an aqueous solution containing an alkali-metal salt of acids of "run" native congo copal resin.

3. A tire cord of improved tensile strength composed of grey cotton fibres which have been momentarily treated with an aqueous solution containing an alkali-metal salt of acids of "run" native congo copal resin.

HOWARD M. BUCKWALTER.

REFERENCES CITED

The following references are of record in the file of this patent:

UNITED STATES PATENTS

| Number | Name | Date |
|---|---|---|
| 2,297,536 | Buckwalter | Sept. 29, 1942 |
| 1,908,716 | Williams | May 16, 1933 |
| 1,482,919 | Ellis | Feb. 5, 1924 |
| 1,579,801 | Babb | Apr. 6, 1926 |

FOREIGN PATENTS

| Number | Country | Date |
|---|---|---|
| 1,483 | Great Britain | 1853 |

OTHER REFERENCES

Mantell, Technology of Natural Resins, page 30.